Patented Aug. 7, 1945

2,381,015

UNITED STATES PATENT OFFICE 2,381,015

PROCESS FOR PREPARING PHENYLENE-
DIAMINE DERIVATIVES

Harold Von Bramer and Lee G. Davy, Kingsport,
Tenn., assignors to Eastman Kodak Company,
Rochester, N. Y., a corporation of New Jersey No Drawing. Application July 7, 1943,
Serial No. 493,762

12 Claims. (Cl. 260—577)

This invention relates to a process for preparing phenylenediamine derivatives and more particularly to a process for preparing N,N'-dialkyl-p-phenylenediamines wherein the alkyl groups can be alike or different.

In the copending application of Harold Von Bramer, Lee G. Davy and Milton L. Clemens, Jr., Serial No. 364,564, filed November 6, 1940 (now United States Patent 2,323,948, dated July 13, 1943), it has been shown that symmetrical N,N'-dialkyl-p-phenylenediamines can be prepared in good yields by hydrogenating a mixture of p-a mixture of a N-alkyl-p-nitroaniline and an aldehyde or ketone, in the presence of a catalyst, comprising essentially a mixture of copper oxide, chromium oxide and barium oxide.

We have now found that not only symmetrical N,N'-dialkyl-p-phenylenediamines but also unsymmetrical N,N'-dialkyl-p-phenylenediamines can be prepared in good yield by hydrogenating a mixture of a N-alkyl-p-nitroaniline and an aldehyde or ketone, in the presence of a catalyst comprising essentially copper oxide, chromium oxide and barium oxide. The N,N'-dialkyl-p-phenylenediamines obtainable by our new process can be readily isolated in a substantially pure form.

It is, accordingly, an object of our invention to provide a new process for preparing N,N'-dialkyl-p-phenylenediamines. Other objects will become apparent hereinafter.

In accordance with our invention, we hydrogenate a mixture of a N-alkyl-p-nitroaniline and a carbonyl compound selected from the group consisting of aliphatic aldehydes and aliphatic ketones, in the presence of a catalyst comprising essentially a mixture of copper oxide, chromium oxide and barium oxide.

To prepare the catalyst, the following process is advantageously employed. A mixture of 1 mole of copper nitrate trihydrate, 1 mole of chromium nitrate nona-hydrate and .1 mole of barium nitrate was dissolved in the minimum amount of water and carefully evaporated to dryness. The residue of intimately mixed nitrates was decomposed by heating gently to the lowest temperature at which decomposition of the nitrates to the corresponding oxides took place, care being taken to prevent a rise in temperature to dull red heat. The lower the temperature of the decomposition, the greater the activity of the catalyst, provided that undecomposed nitrates are removed from the catalyst before use. The nitrates can conveniently be removed by thorough washing. While in general the proportions of oxides set forth above, viz. 10:10:1 molar proportions, are preferred, other proportions can be used. The amount of catalyst used is advantageously from about 0.5 per cent to about 10 per cent of the weight of the mixture of N-alkyl-p-nitroaniline and carbonyl compound.

The molar ratio of carbonyl compound to N-alkyl-p-nitroaniline is advantageously more than 2:1, and is preferably between about 2:1 and about 10:1. The temperature employed is advantageously between about 100° C. and about 170° C. The hydrogen pressure employed is advantageously between about 1000 and 1500 pounds per square inch. The reaction mass is preferably vigorously agitated during the hydrogenation. Usually the hydrogenations are complete in from 6 to 10 hours.

When the hydrogenations are complete, the reaction masses are filtered to remove the catalyst and then vacuum distilled at pressures from 0.1 to 0.2 mm. of mercury.

The following examples will serve to illustrate our new process.

*Example 1.—N,N'-di-(secondary butyl)-p-phenylenediamine*

194 g. (1 mole) of N-secondary butyl-p-nitroaniline were dissolved in 144 g. (2 moles) of methylethyl ketone and placed in a steel hydrogenating autoclave. 27 g. of catalyst consisting of an intermixture of copper oxide, chromium oxide and barium oxide were added to the solution. The autoclave was sealed and the reaction mass heated to a temperature of 165° C. Hydrogen was introduced until the pressure was 1500 pounds per square inch. The reaction mass was agitated for 6½ hours under these conditions, after which the temperature was allowed to fall to room temperature. The pressure on the autoclave was released and the reaction mass was filtered to remove the catalyst. The filtered reaction mass was heated to distill off excess methylethyl ketone. The residue was then distilled under vacuum. 210.3 g. of N,N'-di-(secondary butyl)-p-phenylenediamine boiling at 95° to 100° C. at 0.1 to 0.2 mm. of mercury pressure were obtained. This quantity represented a yield of 95.7 per cent. 4 g. of material remained in the still pot as residue.

*Example 2.—N-secondary butyl-N'-isopropyl-p-phenylenediamine*

194 g. (1 mole) of N-secondary butyl-p-nitroaniline were dissolved in 145 g. (2.5 moles) of acetone. The mixture was placed in a steel hydrogenating autoclave along with 27 g. of a catalyst consisting of an intimate mixture of copper oxide, chromium oxide and barium oxide. The autoclave was then sealed and the reaction mass was heated to 165° C. Hydrogen was introduced until the pressure rose to 1500 pounds per square inch. The reaction mass was then agitated under these conditions for 6½ hours, after which time the temperature was allowed to fall to that of the room. The pressure was then released and the reaction mass was filtered to remove the catalyst. The filtered mass was heated to distill off excess acetone. The residue was distilled under vacuum. 205.1 g. of N-secondary butyl-N'-isopropyl-p-phenylenediamine boiling at 90° to 95° C. at 0.1 to 0.2 mm. of mercury pressure were obtained. This quantity represented a yield of 99.5 per cent. 3.4 g. of material remained in the still pot as residue.

In a manner similar to that illustrated in the foregoing examples, other N-alkyl-p-nitroanilines, e. g. N-methyl-p-nitroaniline, N-ethyl-p-nitroaniline or N-n-propyl-p-nitroaniline can be reductively alkylated using acetone, methyl ethyl ketone, diethyl ketone, methyl n-propyl ketone, methyl primary n-butyl ketone, methyl secondary butyl ketone, methyl isobutyl ketone, methyl tertiary butyl ketone or any of the methyl amyl ketones. Acetophenone and cyclohexanone can be used. Likewise, in a manner similar to that illustrated in the foregoing examples, N-alkyl-p-nitroanilines can be reductively alkylated with an aldehyde, such as acetaldehyde, propionaldehyde, n-butyraldehyde, isobutyraldehyde or isomeric valdehydes. However, whenever aldehydes are employed, alkylation proceeds to stages beyond the di-substituted phenylenediamines, unless the reaction is controlled by lowering the temperature and hydrogen pressure, so as to intercept the reaction when the required amount of hydrogen has been absorbed. This tendency for alkylation to go beyond the di-substituted derivatives appears to be substantially absent when ketones are employed.

The phenylenediamine derivatives prepared in accordance with our new process retard the deterioration of cracked gasoline when incorporated therein. However, the derivatives prepared from aldehydes are of practically no utility in this respect since they introduce very bad color in the gasoline. The derivatives prepared from ketones on the other hand are remarkable in that gasolines containing them remain colorless even after months of exposure to air and light. Any of the derivatives obtainable by our process can be employed as dye intermediates.

Hydrogenation catalysts such as Raney nickel are not suitable in practicing our process, since in their presence appreciable hydrogenation of the benzene ring of the N-alkyl-p-nitroaniline takes place.

The N-secondary butyl-p-nitroaniline employed in the above examples can be prepared by condensing p-chloronitrobenzene with secondary butyl amine, in the presence of potassium dichromate, in accordance with the disclosure of our copending application, Serial No. 493,761 filed of even date herewith.

What we claim as our invention and desire to secure by Letters Patent of the United States is:

1. A process for preparing a N,N'-dialkyl-p-phenylenediamine comprising hydrogenating a mixture of a N-alkyl-p-nitroaniline and a compound selected from the group consisting of aliphatic aldehydes and aliphatic ketones, in the presence of a catalyst comprising essentially an intimate mixture of copper oxide, chromium oxide and barium oxide.

2. A process for preparing a N,N'-dialkyl-p-phenylenediamine comprising hydrogenating a mixture of a N-alkyl-p-nitroaniline and an aliphatic ketone, in the presence of a catalyst comprising essentially an intimate mixture of copper oxide, chromium oxide and barium oxide.

3. A process for preparing a N,N'-di-(secondary alkyl)-p-phenylenediamine comprising hydrogenating a mixture of N-secondary alkyl-p-nitroaniline and an aliphatic ketone, in the presence of a catalyst comprising essentially an intimate mixture of copper oxide, chromium oxide and barium oxide.

4. A process for preparing a N,N'-di-(secondary alkyl)-p-phenylenediamine comprising hydrogenating a mixture of N-secondary alkyl-p-nitroaniline and an aliphatic ketone, in the presence of from about 0.5 per cent to about 10 per cent by weight of the mixture of the nitroaniline and ketone, of a catalyst comprising essentially an intimate mixture of copper oxide, chromium oxide and barium oxide.

5. A process for preparing a N,N'-di-(secondary alkyl)-p-phenylenediamine comprising hydrogenating a mixture of a N-secondary alkyl-p-nitroaniline and an aliphatic ketone, in the presence of from about 0.5 per cent to about 10 per cent by weight of the mixture of the nitroaniline and the ketone, at a temperature of from about 100° to about 170° C.

6. A process for preparing a N,N'-di-(secondary butyl)-p-phenylenediamine comprising hydrogenating a mixture of N-secondary butyl-p-nitroaniline and methylethyl ketone, in the presence of a catalyst comprising essentially an intimate mixture of copper oxide, chromium oxide and barium oxide.

7. A process for preparing a N,N'-di-(secondary butyl)-p-phenylenediamine comprising hydrogenating a mixture of N-secondary butyl-p-nitroaniline and methylethyl ketone, in the presence of from about 0.5 per cent to about 10 per cent by weight of the mixture of the nitroaniline and ketone, of a catalyst comprising essentially an intimate mixture of copper oxide, chromium oxide and barium oxide.

8. A process for preparing a N,N'-di-(secondary butyl)-p-phenylenediamine comprising hydrogenating a mixture of N-secondary butyl-p-nitroaniline and methylethyl ketone, in the presence of from about 0.5 per cent to about 10 per cent by weight of the mixture of the nitroaniline and ketone, of a catalyst comprising essentially an intimate mixture of copper oxide, chromium oxide and barium oxide, at a temperature of from about 100° to about 170° C.

9. A process for preparing a N-secondary butyl-N'-isopropyl-p-phenylenediamine comprising hydrogenating a mixture of N-secondary butyl-p-nitroaniline and acetone, in the presence of a catalyst comprising essentially an intimate mixture of copper oxide, chromium oxide and barium oxide.

10. A process for preparing a N-secondary butyl-N'-isopropyl-p-phenylenediamine comprising hydrogenating a mixture of N-secondary butyl-p-nitroaniline and acetone, in the presence of from about 0.5 per cent to about 10 per cent by weight of the nitroaniline and acetone, of a catalyst comprising essentially an intimate mixture of copper oxide, chromium oxide and barium oxide.

11. A process for preparing a N-secondary butyl-N'-isopropyl-p-phenylenediamine comprising hydrogenating a mixture of N-secondary butyl-p-nitroaniline and acetone, in the presence of from about 0.5 per cent to about 10 per cent by weight of the nitroaniline and acetone, of a catalyst comprising essentially an intimate mixture of copper oxide, chromium oxide and barium oxide, at a temperature of from about 100° C. to about 170° C.

12. N-secondary butyl-N'-isopropyl-p-phenylenediamine.

HAROLD VON BRAMER.
LEE G. DAVY.

CERTIFICATE OF CORRECTION.

Patent No. 2,381,015.                                                         August 7, 1945.

HAROLD VON BRAMER, ET AL.

It is hereby certified that error appears in the printed specification of the above numbered patent requiring correction as follows: Page 1, first column, line 13, strike out "a mixture of a N-alkyl-" and insert instead --phenylenediamine or--; and that the said Letters Patent should be read with this correction therein that the same may conform to the record of the case in the Patent Office.

Signed and sealed this 13th day of November, A. D. 1945.

Leslie Frazer (Seal)                      First Assistant Commissioner of Patents.

copper oxide, chromium oxide and barium oxide.

11. A process for preparing a N-secondary butyl-N'-isopropyl-p-phenylenediamine comprising hydrogenating a mixture of N-secondary butyl-p-nitroaniline and acetone, in the presence of from about 0.5 per cent to about 10 per cent by weight of the nitroaniline and acetone, of a catalyst comprising essentially an intimate mixture of copper oxide, chromium oxide and barium oxide, at a temperature of from about 100° C. to about 170° C.

12. N-secondary butyl-N'-isopropyl-p-phenylenediamine.

HAROLD VON BRAMER.
LEE G. DAVY.

CERTIFICATE OF CORRECTION.

Patent No. 2,381,015.                                    August 7, 1945.

HAROLD VON BRAMER, ET AL.

It is hereby certified that error appears in the printed specification of the above numbered patent requiring correction as follows: Page 1, first column, line 13, strike out "a mixture of a N-alkyl-" and insert instead --phenylenediamine or--; and that the said Letters Patent should be read with this correction therein that the same may conform to the record of the case in the Patent Office.

Signed and sealed this 13th day of November, A. D. 1945.

Leslie Frazer (Seal)                     First Assistant Commissioner of Patents.